United States Patent [19]

Furukawa

[11] Patent Number: 5,395,712
[45] Date of Patent: Mar. 7, 1995

[54] PASTE-TYPE NICKEL ELECTRODE FOR AN ALKALINE STORAGE BATTERY AND AN ALKALINE STORAGE BATTERY CONTAINING THE ELECTRODE

[75] Inventor: Jun Furukawa, Iwaki, Japan

[73] Assignee: Furukawa Denchi Kabushiki Kaisha, Japan

[21] Appl. No.: 95,257

[22] Filed: Jul. 22, 1993

[30] Foreign Application Priority Data

Jul. 28, 1992 [JP] Japan .................................. 4-220678
Dec. 24, 1992 [JP] Japan .................................. 4-357500

[51] Int. Cl.$^6$ ............................................. H01M 4/62
[52] U.S. Cl. .................................. 429/206; 429/223; 429/232
[58] Field of Search ........................ 429/223, 232, 206

[56] References Cited

U.S. PATENT DOCUMENTS

| | | | |
|---|---|---|---|
| 1,081,531 | 12/1913 | Hubbell | 429/232 X |
| 2,833,847 | 5/1958 | Salauze | 429/223 X |
| 3,853,624 | 12/1974 | Brown et al. | 429/223 X |
| 4,016,091 | 4/1977 | Jackovitz et al. | 429/223 X |
| 4,481,128 | 11/1984 | Jackovitz et al. | 429/206 X |
| 5,079,110 | 1/1992 | Nakahori et al. | 429/223 X |
| 5,244,758 | 9/1993 | Bronoel et al. | 429/233 |

FOREIGN PATENT DOCUMENTS

| | | |
|---|---|---|
| 581275 | 2/1994 | European Pat. Off. . |
| 59-163762 | 9/1984 | Japan .................................. 429/223 |
| 60-151964 | 8/1985 | Japan . |

OTHER PUBLICATIONS

*Patent Abstracts of Japan*, vol. 9, No. 15, 22 Jan. 1985, re JP-A-59 163 762, 14 Sep. 1984.
*Patent Abstracts of Japan*, vol. 9, No. 15, 22 Jan. 1985, re JP-A-59 165 373, 18 Sep. 1984.
*Patent Abstracts of Japan*, vol. 9, No. 318, 13 Dec. 1985, re JP-A-60 151 964, 10 Aug. 1985.
*Patent Abtracts of Japan*, vol. 15, No. 428, 30 Oct. 1991, re JP-A-03 179 664, 5 Aug. 1991.

*Primary Examiner*—Stephen Kalafut
*Attorney, Agent, or Firm*—Breiner & Breiner

[57] ABSTRACT

A paste-type nickel electrode for an alkaline storage battery and an alkaline storage battery containing the electrode are described. In one embodiment, the paste-type nickel electrode contains a nickel filamentary powder electroconductive agent having a network of three-dimensional chain structures with an average diameter of equal to or less than about 1.3 µm. When the paste-type nickel electrode is used as the positive electrode of an alkaline storage battery, a high capacity, long-life alkaline storage battery is obtained. In a second embodiment, an improved alkaline storage battery is obtained through the provision of a paste-type nickel positive electrode plate containing at least one of a Co powder and a CoO powder as an electroconductive agent and an alkaline electrolyte solution having an alkaline concentration of 35 wt. % or greater. In a most preferred embodiment, this latter alkaline storage battery additionally contains a nickel powder electroconductive agent having a network of three-dimensional chains with an average diameter of 1.3 µm or less in the positive electrode.

7 Claims, 2 Drawing Sheets

PASTE-TYPE NICKEL ELECTRODE FOR AN ALKALINE STORAGE BATTERY AND AN ALKALINE STORAGE BATTERY CONTAINING THE ELECTRODE

FIELD OF INVENTION

This invention relates to a paste-type nickel electrode for an alkaline storage battery and an alkaline storage battery containing the electrode. One embodiment of the electrode uses a nickel powder electroconductive agent having a network of three-dimensional chains. A second and separate embodiment involves an alkaline storage battery including an electrode having at least one of a cobalt or cobalt oxide powder electroconductive agent and an alkaline electrolyte solution having an alkaline concentration of 35% or higher. A particularly preferred embodiment is the construction of an alkaline storage battery utilizing a paste-type nickel electrode including both a nickel powder having a network of three-dimensional chains and at least one of a cobalt or cobalt oxide powder, and an alkaline electrolyte solution having an alkaline concentration of 35% or higher.

BACKGROUND OF INVENTION

Paste-type nickel electrodes useful as a positive electrode in an alkaline storage battery have been developed in the industry to replace sintered-type nickel electrodes. These conventionally known nickel electrodes are manufactured by first mixing a nickel hydroxide powder with a cobalt or nickel powder which serves as an electroconductive agent. Thereafter, an aqueous solution of a thickener, such as carboxymethylcellulose (CMC), is added to the mixture and kneaded to provide a pasty material. The pasty material is then applied to a foam nickel base plate or substrate, or to a fibrous nickel felt, net-like or latticed porous metal base plate or substrate, so that the substrate is impregnated and/or coated with the pasty material. The substrate is then dried and pressed to obtain a paste-type nickel electrode plate. This electrode plate is used as a positive electrode in an alkaline storage battery, such as a nickel-cadmium storage battery, a nickel hydrogen battery or the like.

With the increased use and demand of portable electrical instruments and appliances in recent years, a strong demand has arisen for an alkaline storage battery that has a high-capacity performance and particularly for a battery having a high-performance nickel electrode. It is generally known, however, that paste-type nickel electrodes are inferior with respect to their coefficient of utilization, rapid or quick discharge characteristics, and length of service life as compared to sintered-type nickel electrodes. To avoid these drawbacks, it has been proposed that, for the purpose of enhancing the conductivity and minimizing polarization within the battery, an active material of primarily nickel hydroxide powder be prepared containing a small amount of cobalt hydroxide and, additionally, a nickel (Ni) powder, a cobalt (Co) powder, a cobalt oxide (CoO) powder or the like as an electroconductive material. This mixture is prepared with an aqueous solution of thickener as described above with respect to conventional paste-type nickel electrodes. However, an alkaline storage battery having overall good performance has not been obtained utilizing such an electrode.

More particularly, sealed-type nickel-hydrogen alkaline storage batteries which have been manufactured comprise a battery element having a paste-type nickel positive electrode containing a small amount of Co or CoO as an active electroconductive material and a hydrogen-occlusion electrode as a negative electrode. The positive and negative electrodes are stacked one upon another with a separator interposed between the electrodes. An alkaline electrolyte solution having a concentration as high as approximately 30 wt. % is utilized therewith. The battery still had a calculated coefficient of utilization lower than a satisfactory level for both the battery capacity and the rapid discharge capacity. The coefficient of utilization as utilized herein defines the relationship between the actual battery capacity obtained and the theoretical capacity of the battery's positive electrode. Additionally, the battery's cycle life is short. A battery having improved performance characteristics in these areas, therefore, would be advantageous.

OBJECTS AND BRIEF DESCRIPTION OF THE INVENTION

A primary object of the present invention is to provide a paste-type nickel positive electrode which when utilized in an alkaline storage battery provides a battery with high-capacity performance including in the positive electrode's coefficient of utilization.

The improvements obtained according to a first embodiment of the invention are realized by the inclusion in a paste-type nickel electrode of a nickel powder electroconductive agent which is a filamentary powder comprising a network of three-dimensional chains. More particularly, the network comprises a plurality of chains of beads branching out in three-dimensional directions wherein the average diameter of the chain portions is equal to or less than about 1.3 micrometers ($\mu$m). Preferably, the average diameter is from about 0.8 to 1.3 $\mu$m. The amount of the nickel powder contained in the electrode is preferably in the range of about 2 to 25 wt. % based on the total weight of an active material, such as a nickel hydroxide powder, also contained in the electrode. A preferred nickel powder useful as an electroconductive agent is commercially available under the tradenames INCO nickel powder type #210 and INCO nickel powder type #205 marketed by INCO Limited, Ontario, Canada. These powders are produced using a carbonyl refining process and have chain portions having an average diameter of about 0.6 to 1.3 $\mu$m.

An alkaline storage battery in which the coefficient of utilization of the positive electrode is increased to thereby improve the capacity, rapid discharge characteristics, and life of the battery is also provided by a second and separate embodiment of the invention. An alkaline storage battery according to the invention utilizes a battery element including of a paste-type nickel positive electrode containing at least one of a Co powder and a CoO powder as an electroconductive agent, a negative electrode, and an alkaline electrolyte solution having an alkaline concentration of 35 wt. % or greater.

A particularly preferred embodiment of the present invention is the construction of an alkaline storage battery utilizing a nickel powder having chain portions with an average diameter of 1.3 $\mu$m or less as described above with at least one of a Co or CoO powder in a positive electrode in conjunction with an alkaline electrolyte solution having an alkaline concentration of 35% or higher. This combination is further enhanced when the nickel powder is present as a mixture of two different particle sizes. The nickel powder preferably includes fine particles in mixture with particles of a size greater than the fine particles. A preferred fine particle size is from about 0.8 to 1.3 μm. This avoids the conversion of all of the nickel powder into an active material as further described below.

DETAILED DESCRIPTION OF PRESENTLY PREFERRED EMBODIMENTS

Figure 1:
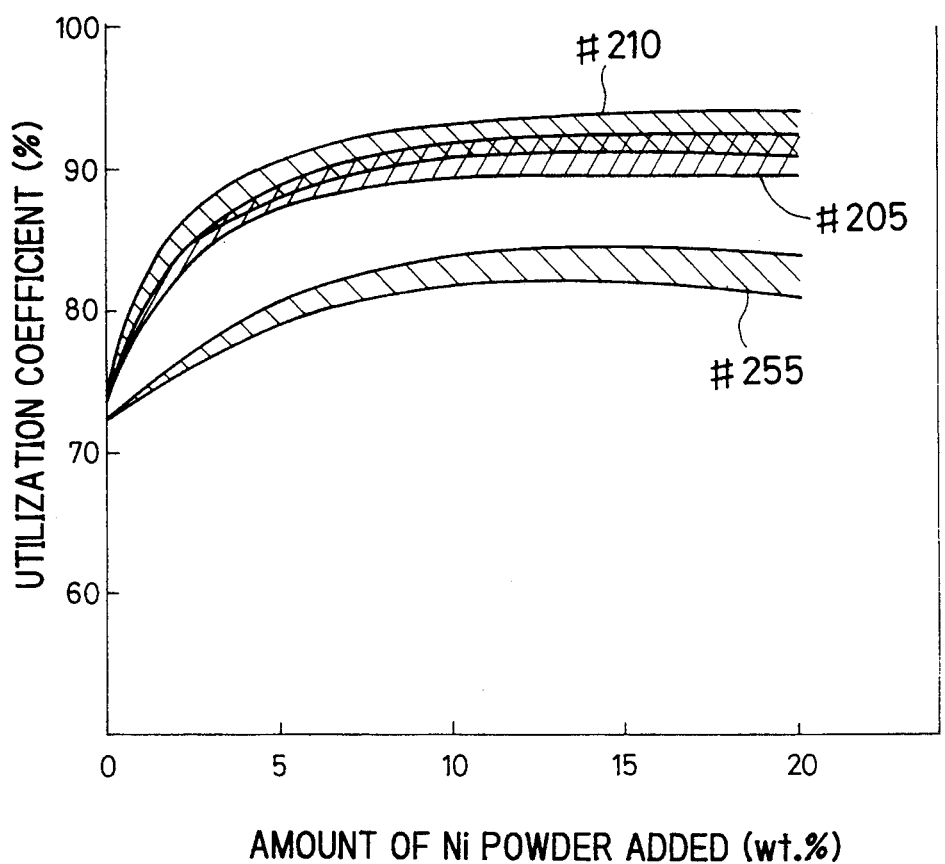
FIG. 1 is a graph showing the relationship between the coefficient of utilization of positive electrodes and the amount in each electrode of different types of INCO carbonyl nickel powder having chain portions of differing average diameters.

Paste-type nickel electrodes for alkaline storage batteries and alkaline storage batteries containing these electrodes according to the present invention are described below through specific examples of preferred embodiments.

A paste-type nickel electrode plate according to the present invention is used as a positive electrode for any kind of alkaline storage battery, such as a nickel-cadmium storage battery, a nickel-hydrogen storage battery or the like. When a paste-type nickel electrode according to the invention is used as a positive electrode in an alkaline storage battery, the battery's capacity is greater than that of conventionally known alkaline storage batteries.

Examples 1–2 below illustrate the first embodiment of a paste-type electrode plate of the invention including a nickel powder having a network of three-dimensional chains in a nickel-hydrogen storage battery. Example 3 below is a comparison example to Examples 1 and 2.

EXAMPLE 1

A paste-type nickel electrode plate for a nickel-hydrogen storage battery was manufactured as follows.

A commercially available nickel hydroxide powder comprising spherical particles was used as a main active component of the nickel electrode plate. This nickel hydroxide powder was mixed with (1) a cobalt powder serving as an electroconductive agent in an amount of 5 wt. % based on the weight of the nickel hydroxide powder, and (2) an ultra-fine nickel powder commercially available under the tradename INCO #210 as marketed by INCO Limited, Ontario, Canada. The ultra-fine nickel powder is a carbonyl nickel filamentary powder comprising a network of chains structured or formed of beads as visible using an electron microscope. The chain portions of the nickel powder have an average diameter of 0.6 to 1.0 μm and a specific surface area of 1.5 to 2.5 m²/g. The ultra-fine nickel powder also serves as an electroconductive agent and was present in an amount of 10 wt. % based on the weight of nickel hydroxide powder. The resultant mixture was combined with a 1.0 wt. % aqueous solution of carboxymethylcellulose, which served as a thickener, and kneaded to obtain a pasty material. The pasty material was applied to a foam nickel base plate or substrate so as to fill in the pores of the substrate. The pasted nickel substrate was then dried and pressed to a predetermined thickness to provide a paste-type nickel electrode plate. The average diameter size of the chain structures of the nickel powder was measured by using a Fisher Subsieve Sizer.

EXAMPLE 2

The same procedures as described in Example 1 above were followed to obtain another paste-type nickel electrode plate, except that in place of the nickel powder INCO #210, INCO nickel powder #205 having chain portions with an average diameter of 0.8 to 1.3 μm and a specific surface area of 1.3 to 2.0 m²/g was used.

EXAMPLE 3

Example 3 is a comparison example in relation to Examples 1 and 2. In place of the nickel powders INCO #210 and #205 as used in Examples 1 and 2 respectively, another nickel powder was used, i.e., INCO nickel powder #255. INCO #255 is also a filamentary powder and has chain portions with an average diameter of 2.2 to 2.8 μm and a specific surface area of 0.5 to 1 m²/g. The same procedures as described in Example 1 above were followed to obtain a paste-type nickel electrode plate.

To show how each of the three nickel powders described in Examples 1–3 having chain portions of different average diameter sizes influences the nickel electrode's coefficient of utilization and battery capacity, the amount of the nickel powders used was varied in a range of from 0 to 20 wt. % in manufacturing paste-type nickel electrodes in the same manner as described in Example 1.

In the comparison test, the positive electrodes of Examples 1–3 were used with a hydrogen-occlusion alloy negative electrode plate. The negative electrode was manufactured as follows. Commercially available misch metal (Mm), Ni, Co and Al powders were each weighed and mixed in a predetermined compounding ratio. This mixture was heated and melted by a high-frequency melting process to obtain a hydrogen-occlusion alloy whose composition is expressed as $MmNi_{3.55}Co_{1.0}Al_{0.05}$. This alloy was pulverized into a hydrogen-occlusion alloy powder having a particle size of 150 mesh or smaller. Mixed with this alloy powder were (1) a nickel powder serving as an electroconductive agent in an amount of 15 wt. % based on the weight of the alloy powder which is taken as 100 wt. % and (2) a polyvinylidene fluoride powder serving as a binding agent in an amount of 3 wt. % based on the weight of the alloy powder. A 1% aqueous solution of carboxymethylcellulose was added to the resultant mixture and the mixture kneaded together to form a pasty material. The pasty material was applied to a nickel-plated, perforated or porous iron plate or substrate. The resultant pasted substrate was dried and roll-pressed, and thereafter heated at 200° C. for two hours to provide a hydrogen-occlusion alloy electrode plate.

Each of the paste-type nickel electrode plates of Examples 1–3 was stacked upon a hydrogen-occlusion electrode negative plate as described above with a nylon separator interposed therebetween to provide a battery element. These battery elements were rolled into a spiral form and inserted into individual cylindrical metal containers. A predetermined quantity of a conventional electrolyte solution of caustic potash or potassium hydroxide was poured into each container and a cover attached and sealed to the containers to provide positive electrode-controlled, nickel-hydrogen batteries wherein the positive electrode's theoretical capacity was rated as 1180 milliampere-hour (mAh).

The batteries were then tested to determine their utilization coefficients and capacities. More specifically, in the tests each battery was charged with a 200 mAh current for 7.5 hours and then discharged with the same current to a final battery voltage of 1.0 Volt (V) to determine the battery capacity. The value obtained by dividing the value of the battery capacity by the theoretical capacity of the positive electrode was taken as the positive electrode's coefficient of utilization. The results are set forth in FIGS. 1 and 2.

Figure 2:
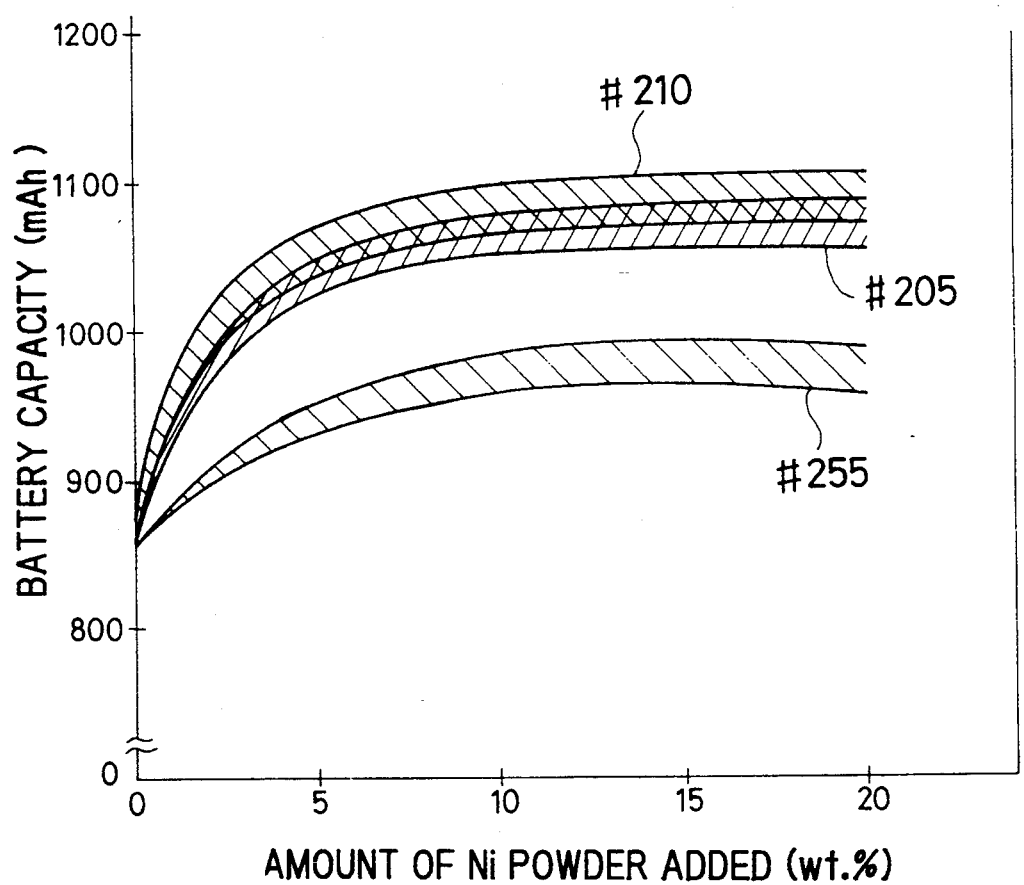
FIG. 2 is a graph showing the relationship between the battery capacity and the amount of different types of INCO carbonyl nickel powder having chain portions of differing average diameters.

As shown in FIGS. 1 and 2, when INCO #210 or #205 nickel powder was used as the electroconductive agent in the positive electrode, the battery capacity and the positive electrode's coefficient of utilization were both much higher as compared to when INCO #255 nickel powder was used as the electroconductive agent. Namely, when nickel powder with chain portions having an average diameter of 1.3 $\mu$m or less is used as the electro-conductive agent, the battery capacity and the positive electrode's coefficient of utilization is improved remarkably. A combined use of INCO #210 and #205 in a positive electrode provides the same advantageous effect as when either INCO #210 or INCO #205 is used alone.

As to the coefficient of utilization of the positive electrode, an 85% or higher coefficient of utilization is generally desired. The amount of the nickel powder preferably used to obtain this coefficient of utilization is about 2.0 wt. % or higher based on the weight of the active powder, such as nickel hydroxide powder, present in the positive electrode. However, when taking into account the capacity of the positive electrode itself and the economics of producing the positive electrode and battery containing the electrode, it is preferable to utilize the nickel powder in an amount not exceeding about 25 wt. %.

Thus, when a paste-type nickel positive electrode is manufactured by using an active material mixed with a nickel powder electroconductive agent including chain portions branching out in three-dimensional directions and having an average diameter equal to or less than 1.3 $\mu$m, the positive electrode's coefficient of utilization is enhanced and a high-capacity, long-life storage battery is obtained.

A second and separate embodiment of the present invention provides an alkaline storage battery having an improved capacity and rapid discharge characteristics and includes a paste-type nickel positive electrode plate containing at least one of a Co powder and a CoO powder as the electroconductive agent, a negative electrode and an alkaline electrolyte solution having an alkaline concentration of about 35 wt. % or greater. This combination is most preferable when the positive electrode of the alkaline storage battery further includes a nickel filamentary powder having a network of three-dimensional chains with an average diameter of 1.3 $\mu$m or less with the Co and/or CoO powder.

When a CoO powder is present in the positive electrode, the CoO powder becomes $HCoO_2$-ions when dissolved in an alkaline electrolyte solution having an alkaline concentration of 35 wt. % or higher. These ions diffuse into spaces present between the particles of the active material of the electrode or, if a nickel powder is additionally present as an electroconductive agent, also into the spaces between the particles of the Ni powder.

As the battery containing the positive electrode and electrolyte solution is charged, the $HCoO_2$-ions are oxidized and formed into CoOOH which functions as an electroconductive agent. When Co powder is present in the electrode, the Co powder itself is not dissolved in the alkaline electrolyte solution. However, it is believed that the dissolved oxygen (DO) in the alkaline electrolyte solution acts on the Co powder and oxidizes it to form CoO which then become $HCoO_2$-ions which function as described above. When the concentration of the alkaline electrolyte solution is about 35 wt. % or greater, the foregoing action is present and effective in bringing about a higher coefficient of utilization for the positive electrode.

The use of a Ni powder in combination with the Co powder and/or the CoO powder as the electroconductive agent is most preferred. The nickel powder when present with a Co and/or CoO powder does not function to assure the conductivity in the micro region involving the CoO powder or the Co powder themselves, but rather is utilized to secure conductivity in the macro region involving the spaces between the particles of the active material. Additionally, part of the Ni powder is changed into an active material during the charging of the battery and it is believed that the changing of the Ni powder into the active material is greater when the concentration of the electrolyte solution is higher. However, if all the Ni powder were turned into the active material, the Ni powder would lose its capability of functioning as an electroconductive agent. Therefore, the Ni powder preferably includes a mixture of particle sizes, i.e., fine particles and particles which are larger in size or coarse as compared to the fine particles. Preferably, the fine nickel powder has an average particle size ranging from about 0.8 to 1.3 $\mu$m and the larger sized nickel powder particles have an average particle size greater than the average particle size of the fine powder.

Example 4 below illustrate the second embodiment of the invention, including the most preferred embodiment.

EXAMPLE 4

Three paste-type nickel electrode plates A, B and C were manufactured as follows:

Electrode plate A

Ten grams of a Ni powder commercially marketed under the tradename INCO #255, 5 grams of a Co powder commercially marketed by Union Miniere and referred to as Extra Fine Co powder, and a conventional nickel hydroxide as used in making positive electrodes comprising spherical particles, were mixed together. Thirty-five grams of a 2% water solution of carboxymethylcellulose was added to the mixture and kneaded together to provide a pasty material. This pasty material was applied to a foam nickel substrate so as to fill the pores of the substrate. The substrate was dried and, thereafter, impregnated with a 5% polytetrafluoroethylene (PTFE) solution which served as a dispersant. The impregnated substrate was dried and roll-pressed to a predetermined thickness to provide a paste-type nickel electrode plate A.

Electrode plate B

Ten grams of Ni powder INCO #255 as used in plate A, 5 grams of a CoO powder commerically available under the tradename FCC-178 and marketed by Sumitomo Kinzoku Kozan K. K., and 85 grams of a spherical nickel hydroxide powder as used in plate A were mixed together. The same procedures as described in manufacturing electrode plate A were then used with this mixture to manufacture paste-type nickel electrode plate B.

Electrode plate C

Five grams of Ni powder INCO #255, 5 grams of Ni powder INCO #210 which has a smaller particle size than the Ni powder INCO #255, and 5 grams of the above-described CoO powder FCC-178 were mixed together. The same procedures used to manufacture electrode plate A were then used to manufacture paste-type nickel electrode plate C.

Each of paste-type nickel electrode plates A, B and C was rated at a theoretical capacity of 1180 mAh.

Electrode plates A, B and C were each used as a positive electrode and stacked in relation to a hydrogen-occlusion alloy negative electrode plate with a separator interposed therebetween and rolled into a spiral form. The negative electrode plate comprised a MmNi system hydrogen-occlusion alloy. Each of the spiral battery elements formed were inserted into a cylindrical container of the same size. Five of each type of battery were manufactured.

Alkaline electrolyte solutions having different concentrations of 25%, 30%, 35%, 37% and 39%, and composed mainly of KOH and a small amount of NaOH and LiOH as the remainder components, were prepared in predetermined equal quantities. Two cubic centimeters (cc) of each electrolyte solution were then placed into each type of battery container as prepared above and a cover immediately attached to seal the battery container in a conventional manner. A plurality of sealed-type nickel-hydrogen batteries having a rated capacity of 1100 mAh were made.

The batteries were each charged with 0.2 Coulomb (C) current at an ambient temperature of 20° C. for 7.5 hours and then discharged with the same current to a final voltage of 1.0 V. This charge-discharge operation was repeated twice. Thereafter, each battery was given an initial activation treatment including a discharge that continued for 24 hours at 40° C. After the initial activation, the following three tests were carried out as to each battery:

(1) Capacity test

Each test battery was charged with 0.2 C current for 7.5 hours at 20° C. and discharged with 3 C current to a final battery voltage of 1.0 V to measure the capacity of the battery and determine the positive electrode's coefficient of utilization in relation thereto;

(2) Rapid discharge test

Each test battery was charged with 0.2 C current for 7.5 hours at 20° C. and discharged with 3 C current to a final battery voltage of 1.0 V to measure the capacity of the battery and determine the positive electrode's coefficient of utilization in relation thereto; and (3) Cycle life test Each test battery was charged with 1 C current by using an electric charger with a $-\Delta V$ system for detecting the completion of charging at 20° C., and discharged with 3 C current to a final battery voltage of 1.0 V. This charge-discharge operation was repeated until the battery capacity dropped to 700 mAh to determine the number of the charge-discharge cycles.

The results of the tests are set forth in Table 1 below.

TABLE 1

| CONCENTRATION OF ELECTROLYTE SOLUTION (wt. %) | POSITIVE ELECTRODE | BATTERY CAPACITY (mah) | COEFFICIENT OF UTILIZATION (%) | RAPID DISCHARGE CAPACITY (mah) | COEFFICIENT OF UTILIZATION (%) | CYCLE LIFE (No. of Times) |
|---|---|---|---|---|---|---|
| 25 | A | 1003 | 25.0 | 773 | 65.5 | <250 |
|    | B | 1015 | 86.0 | 779 | 66.0 | <250 |
|    | C | 1050 | 89.0 | 808 | 68.5 | <250 |
| 30 | A | 1062 | 90.0 | 885 | 75.0 | <400 |
|    | B | 1074 | 91.0 | 891 | 75.5 | <400 |
|    | C | 1097 | 93.0 | 909 | 77.8 | <400 |
| 35 | A | 1156 | 98.0 | 1003 | 85.0 | >500 |
|    | B | 1168 | 99.0 | 1027 | 87.0 | >500 |
|    | C | 1227 | 104.0 | 1050 | 89.0 | >500 |
| 37 | A | 1192 | 101.0 | 1068 | 90.5 | >500 |
|    | B | 1239 | 105.0 | 1080 | 91.5 | >500 |
|    | C | 1274 | 108.0 | 1109 | 94.0 | >500 |
| 39 | A | 1168 | 99.0 | 1003 | 85.0 | >500 |
|    | B | 1180 | 100.0 | 1015 | 86.0 | >500 |
|    | C | 1204 | 102.0 | 1035 | 87.7 | >500 |

As shown by the results set forth in Table 1, when the concentration of the alkaline electrolyte solution was 25 wt. %, the battery capacity and the positive electrode's coefficient of utilization with respect thereto, and the rapid discharge capacity and the positive electrode's coefficient of utilization with respect thereto, were all low and only a short cycle life of 250 cycles or less was obtained. When the concentration of the electrolyte solution was 30 wt. %, both the battery capacity and the positive electrode's coefficient of utilization in relation thereto were satisfactorily enhanced. However, the rapid discharge capacity and the positive electrode's coefficient of utilization in relation thereto were found to be insufficient. Additionally, the cycle life was short, i.e., 400 cycles or less.

Compared with the above, when the concentration of the alkaline electrolyte solution was 35 wt. % or higher, the battery capacity and the positive electrode's coefficient of utilization in relation thereto as well as the rapid discharge capacity and the positive electrode's coefficient of utilization in relation thereto, were all remarkably enhanced. Further, the cycle life was as long as 500 cycles or more.

The same tests as described above were also conducted with alkaline storage batteries wherein the positive electrode was a paste-type nickel electrode containing a mixture of Co powder and CoO powder as the electroconductive agent and having electrolyte solutions of the same differing concentrations as above. These tests also showed similar improvements as above with respect to the battery capacity, the positive electrode's coefficient of utilization and the rapid discharge characteristics.

The powder electroconductive agents comprising a Co powder, a CoO powder, and/or a Ni powder can be used without modification. Alternatively, the powders can be subjected to manual or mechanical pulverization by using a mortar or a mill such as a ball and then mixed with an active material to prepare the mixture for use. Further, any of the electroconductive agents and the active material can be mixed together and then be subjected to pulverization to prepare the mixture for use.

The active nickel hydroxide powder used in the positive electrode of the different embodiments can contain a small amount of cobalt hydroxide, e.g., about 1 wt. % based on the weight of the active material.

Additionally, the alkaline electrolyte can be composed of KOH alone or with additional components, such as NaOH and LiOH. When the alkaline electrolyte solution comprises the three components of KOH, NaOH and LiOH, it is preferred to have the KOH component present in a major amount, i.e., accounting for 75 wt. % or greater based on the total weight of the three components.

Thus, when the concentration of the alkaline electrolyte solution is 35 wt. % or higher in an alkaline storage battery containing a paste-type nickel positive electrode plate including at least one of a Co powder and a CoO powder as an electroconductive agent, an alkaline storage battery is obtained having an increased coefficient of utilization of the positive electrode, enhanced rapid discharge characteristics and a long battery life. When a nickel powder having a network of three-dimensional chains with an average diameter of 1.3 $\mu$m or less is used as the electroconductive agent in the above positive electrode plate with the electrolyte solution, an alkaline storage battery having excellent performance characteristics is obtained.

As will be apparent to one skilled in the art, various modifications can be made within the scope of the aforesaid description. Such modifications being within the ability of one skilled in the art form a part of the present invention and are embraced by the appended claims.

It is claimed:

1. An alkaline storage battery comprising a negative electrode, a positive electrode, a separator and an alkaline electrolyte solution wherein said positive electrode is a paste-type nickel electrode comprising an active nickel powder and an electroconductive agent comprising a nickel filamentary powder having a plurality of chain structures wherein the chain structures have an average diameter greater than 0 but equal to or less than 1.3 $\mu$m; and wherein said alkaline electrolyte solution has an alkaline concentration of about 35 wt. % or higher.

2. An alkaline storage battery according to claim 1 wherein said alkaline concentration is from about 35–39 wt. %.

3. An alkaline storage battery comprising a negative electrode, a positive electrode, a separator and an alkaline electrolyte solution wherein said positive electrode is a paste-type nickel electrode comprising an active nickel powder and an electroconductive agent comprising a nickel filamentary powder having a plurality of chain structures wherein the chain structures have an average diameter greater than 0 but equal to or less than 1.3 $\mu$m; and wherein said alkaline electrolyte solution comprises potassium hydroxide, sodium hydroxide and lithium hydroxide, and wherein said potassium hydroxide is present in a major amount in relation to said sodium hydroxide and said lithium hydroxide.

4. An alkaline storage battery comprising a negative electrode, a separator, a paste-type nickel positive electrode including an electroconductive agent comprising at least one of a cobalt powder and a cobalt oxide powder, and an alkaline electrolyte solution having an alkaline concentration of about 35 wt. % or higher.

5. An alkaline storage battery according to claim 4 wherein said electroconductive agent further comprises a nickel filamentary powder having a plurality of chain structures with an average diameter of greater than 0 but less than or equal to about 1.3 $\mu$m.

6. An alkaline storage battery according to claim 4 wherein said alkaline concentration is from about 35–39 wt. %.

7. An alkaline storage battery according to claim 4 wherein said alkaline electrolyte solution comprises potassium hydroxide, sodium hydroxide and lithium hydroxide, and wherein said potassium hydroxide is present in a major amount in relation to said sodium hydroxide and said lithium hydroxide.

* * * * *